(12) United States Patent
Rim

(10) Patent No.: US 6,739,579 B1
(45) Date of Patent: May 25, 2004

(54) EXHAUST VALVE FOR COMBUSTION ENGINES

(75) Inventor: Dean Jinkyu Rim, Bloomfield Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/130,782

(22) PCT Filed: Dec. 29, 1999

(86) PCT No.: PCT/US99/31159

§ 371 (c)(1),
(2), (4) Date: May 21, 2002

(87) PCT Pub. No.: WO01/50047

PCT Pub. Date: Jul. 12, 2001

(51) Int. Cl.[7] ................................................. F16K 1/22
(52) U.S. Cl. .................................... 251/306; 237/123 A
(58) Field of Search ................................ 251/306, 305; 237/12.3 A, 12.3 B, 12.3 R

(56) References Cited

U.S. PATENT DOCUMENTS

| | | | |
|---|---|---|---|
| 3,807,690 A | 4/1974 | Pfundstein | |
| 4,037,819 A | 7/1977 | Kindersley | |
| 4,083,529 A | 4/1978 | Santy et al. | |
| 4,146,176 A | 3/1979 | Beauvais et al. | |
| 4,176,823 A | 12/1979 | Gliatas | |
| 4,744,572 A | 5/1988 | Sahba et al. | |
| 4,872,642 A | * 10/1989 | Oshima | 251/306 |
| 4,884,744 A | 12/1989 | Padgaonkar | |
| 5,632,304 A | 5/1997 | Kempka et al. | |
| 5,673,895 A | * 10/1997 | Kaneko | 251/306 |

* cited by examiner

Primary Examiner—John Bastianelli
(74) Attorney, Agent, or Firm—Brinks Hofer Gilson & Lione

(57) ABSTRACT

An exhaust valve (10) includes a housing (44) having a passageway (46) extending axially therethrough. The exhaust valve (10) also includes a rotatable butterfly plate (50) disposed in the passageway (46) of the housing (44) and having an annular groove (52) in a periphery thereof. The exhaust valve (10) further includes a ring seal (60) disposed in the groove (52) and being radially compressible and expandable for engagement and disengagement with the housing for opening and closing the passageway (46) to allow and prevent exhaust gases flowing therethrough.

9 Claims, 4 Drawing Sheets

EXHAUST VALVE FOR COMBUSTION ENGINES

BACKGROUND OF THE INVENTION

1. Field of the Invention

The present invention relates generally to exhaust heat recovery systems for motor vehicles and, more specifically, to an exhaust valve for a combustion engine in a motor vehicle.

2. Description of the Related Art

It is known to provide a supplemental heating device such as an exhaust heat recovery system for a motor vehicle to harness waste heat from exhaust gases to heat air for an occupant compartment of the motor vehicle. Generally, the exhaust heat recovery system includes an exhaust pipe mounted to an exit end of a catalytic converter of an exhaust system of the motor vehicle and a heat exchanger mounted to and in parallel with the exhaust pipe. The exhaust heat recovery system also includes a by-pass valve to control the flow of exhaust gases from the catalytic converter through either the exhaust pipe or the heat exchanger. The exhaust heat recovery system includes a back-pressure valve in series with the heat exchanger to prevent exhaust gases from re-entering the heat exchanger and provides back pressure against an engine of the motor vehicle to load the engine to reject more heat. The exhaust heat recovery system further includes an inlet and an outlet connected to the heat exchanger to allow coolant to flow therethrough to provide additional heat.

The by-pass valve is of a butterfly plate type to provide sealing against exhaust gases during a backpressure mode of the exhaust heat recovery system. The exhaust by-pass valve must divert all exhaust gases through the heat exchanger and ensure that a leakfree environment is maintained while under backpressure. However, current exhaust by-pass valves include machined "face seals" on a valve housing for the butterfly plate to seal against and high force springs on a valve shaft to promote good sealing of the butterfly plate against "bushing" leakage. The current exhaust by-pass valves have high torque requirements provided by an actuator for sealing the butterfly plate on the face seal, gaps between the butterfly plate and valve housing for thermal expansion and thin walls on the valve housing to avoid welding distortions.

Although the above exhaust by-pass valves have worked, they suffer from the disadvantage that they have a relatively large leak rate, which is undesired. Another disadvantage of the exhaust by-pass valves is that high tolerance machining is required for both face sealing and the bushings. Yet another disadvantage of the exhaust by-pass valves is that the exhaust by-pass valve may not seal well due to holes near ends of the shaft. Still another disadvantage of the exhaust by-pass valves is that, after thermal cycling, vibration cycling, soot-build up and corrosion, the valve has the potential to loose its leak performance. A further disadvantage of the exhaust by-pass valves is that they require a reaming process in the hole for the butterfly plate and there are many components. Therefore, there is a need in the art to provide an exhaust by-pass valve for an exhaust heat recovery system in a motor vehicle, which overcomes these disadvantages.

SUMMARY OF THE INVENTION

Accordingly, the present invention is an exhaust valve including a housing having a passageway extending axially therethrough. The exhaust valve also includes a rotatable butterfly plate disposed in the passageway of the housing and having an annular groove in a periphery thereof. The exhaust valve further includes a ring seal disposed in the groove. The ring seal is radially compressible and expandable for engagement and disengagement with the housing for opening and closing the passageway to allow and prevent exhaust gases flowing therethrough.

One advantage of the present invention is that a new exhaust valve is provided for a combustion engine in a motor vehicle. Another advantage of the present invention is that the exhaust valve eliminates bearing/bushing leakage under backpressure. Yet another advantage of the present invention is that the exhaust valve incorporates a "ring seal" in the butterfly plate. Still another advantage of the present invention is that the exhaust valve has a shaft and bushings for the shaft disposed after the ring seal and perpendicular with the butterfly plate. A further advantage of the present invention is that the exhaust valve provides better exhaust sealing performance under backpressure for an exhaust heat recovery system at a reduced manufacturing cost. Yet a further advantage of the present invention is that the exhaust valve improves emissions, windscreen defrosting time, occupant comfort and overall operator satisfaction.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
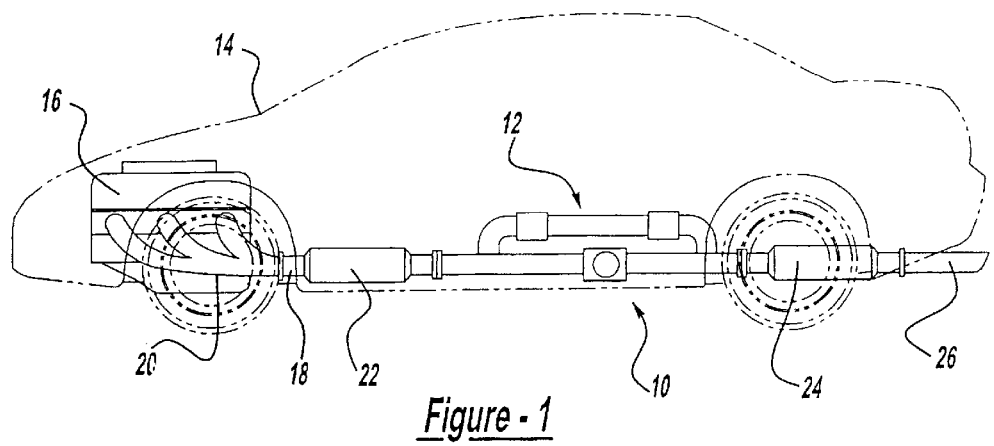
FIG. 1 is a diagrammatic view of an exhaust valve, according to the present invention, illustrated in operational relationship with an exhaust heat recovery system in a motor vehicle.
Figure 2:
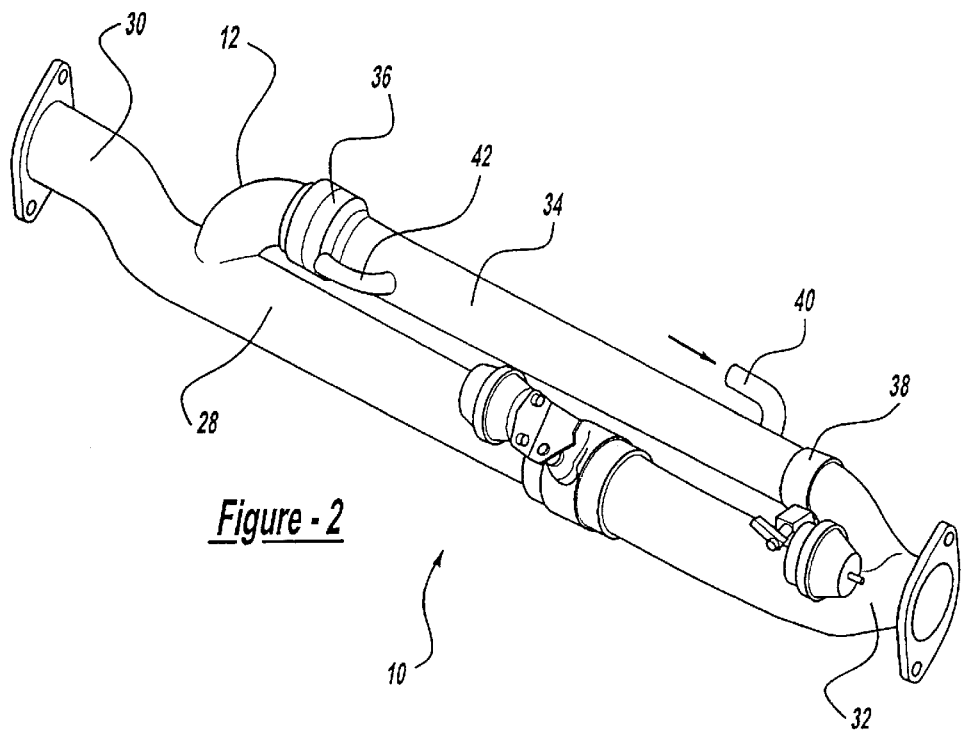
FIG. 2 is a perspective view of the exhaust valve and exhaust heat recovery system of FIG. 1.
Figure 3:
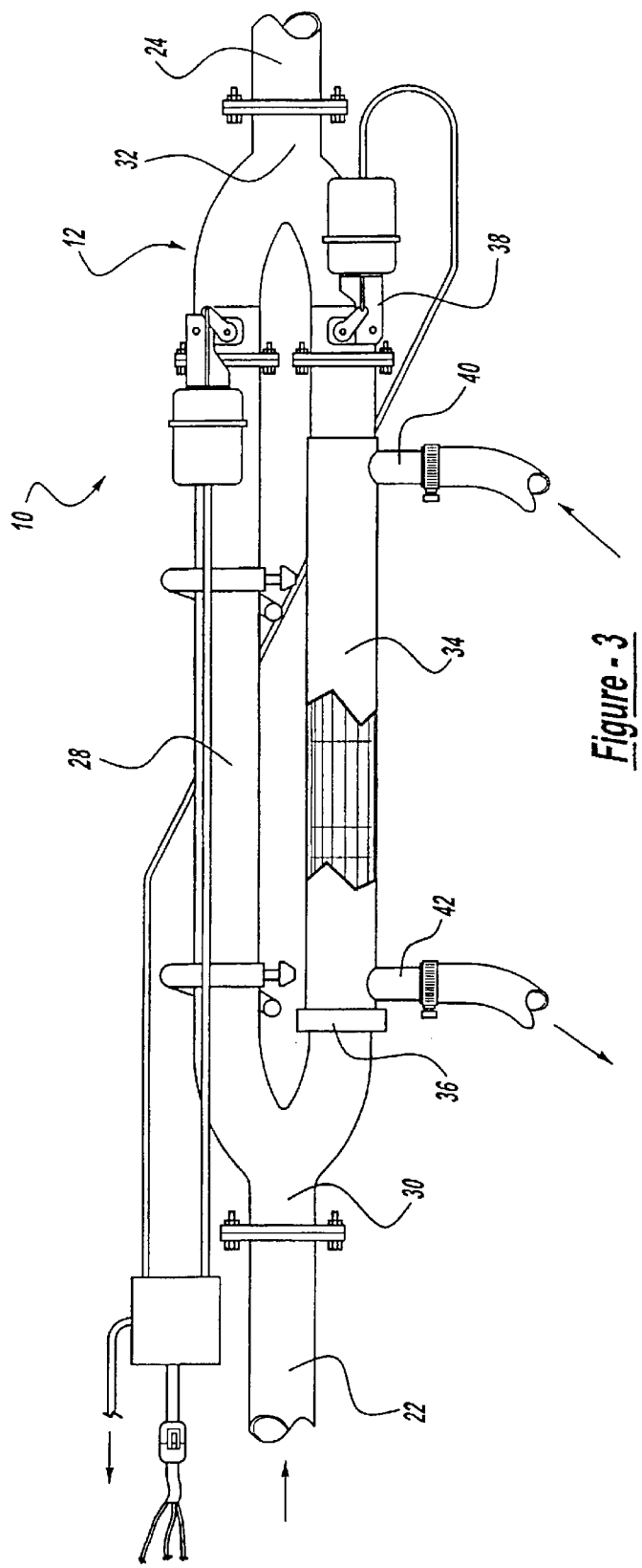
FIG. 3 is an enlarged elevational view of the exhaust valve and exhaust heat recovery system of FIG. 2.

Referring to the drawings and in particular FIGS. 1 through 3, one embodiment of an exhaust valve 10, according to the present invention, is illustrated for an exhaust heat recovery system, generally indicated at 12, in a motor vehicle 14. The motor vehicle 14 includes a combustion engine 16 and an exhaust system 18 connected to the engine 16. The exhaust system 18 includes an exhaust manifold 20 connected to the engine 16 and a catalytic converter 22 connected to the exhaust manifold 20. In this embodiment, the exhaust heat recovery system 12 is connected to an exit end of the catalytic converter 22 to provide supplemental heat to an occupant compartment (not shown) of the motor vehicle 14 from the heat of the exhaust gases from the engine 16. The exhaust system 18 further includes a muffler 24 connected to an exit end of the exhaust heat recovery system 12 and a tailpipe 26 connected to the muffler 24. It should be appreciated that, except for the exhaust heat recovery system 12, the motor vehicle 14 is conventional and known in the art.

Referring to FIGS. 2 and 3, the exhaust heat recovery system 12 includes an exhaust pipe 28 extending longitudinally and having a first end 30 connected to the catalytic converter 22 by suitable means such fasteners (not shown). The exhaust pipe 28 also has a second end 32 connected to the muffler 24 by suitable means such as fasteners (not shown). The exhaust heat recovery system 12 also includes a heat exchanger 34 extending longitudinally and generally parallel to the exhaust pipe 28. The heat exchanger 34 is connected to the first end 30 by suitable means such as a flex pipe 36. The heat exchanger 34 is connected to the second end 32 by suitable means such as a backpressure valve 38. The heat exchanger 34 has a coolant inlet 40 at one end operatively connected to a heating system (not shown) and a coolant outlet 42 at the other end operatively connected to the heating system of the motor vehicle 14. The exhaust heat recovery system 12 also includes the exhaust valve 10 interconnecting the first end 30 and second end 32 of the exhaust pipe 28. It should be appreciated that, except for the exhaust valve 10, the exhaust heat recovery system 12 is conventional and known in the art.

Figure 4:
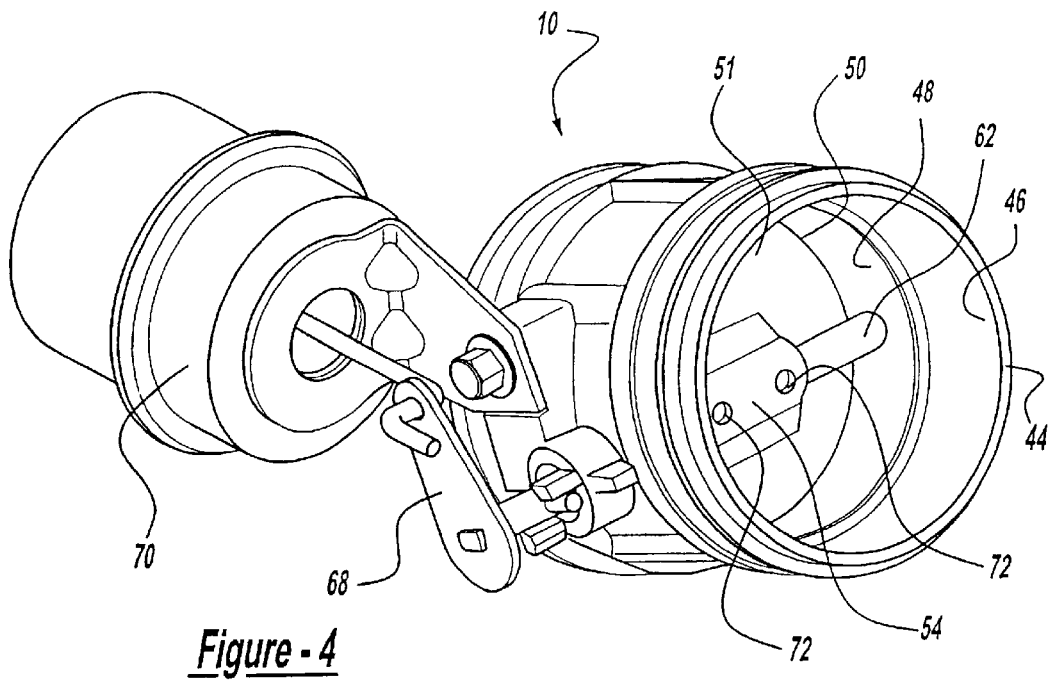
FIG. 4 is a perspective view of the exhaust valve of FIG. 1.
Figure 5:
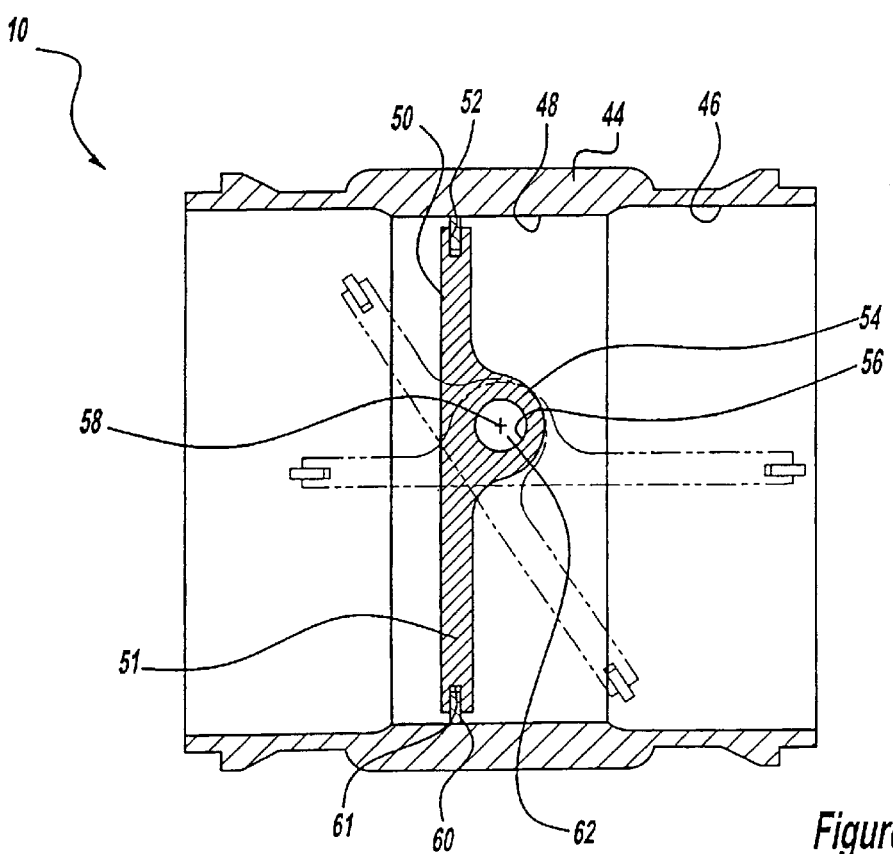
FIG. 5 is a fragmentary side elevational view of the exhaust valve of FIG. 1.
Figure 6:
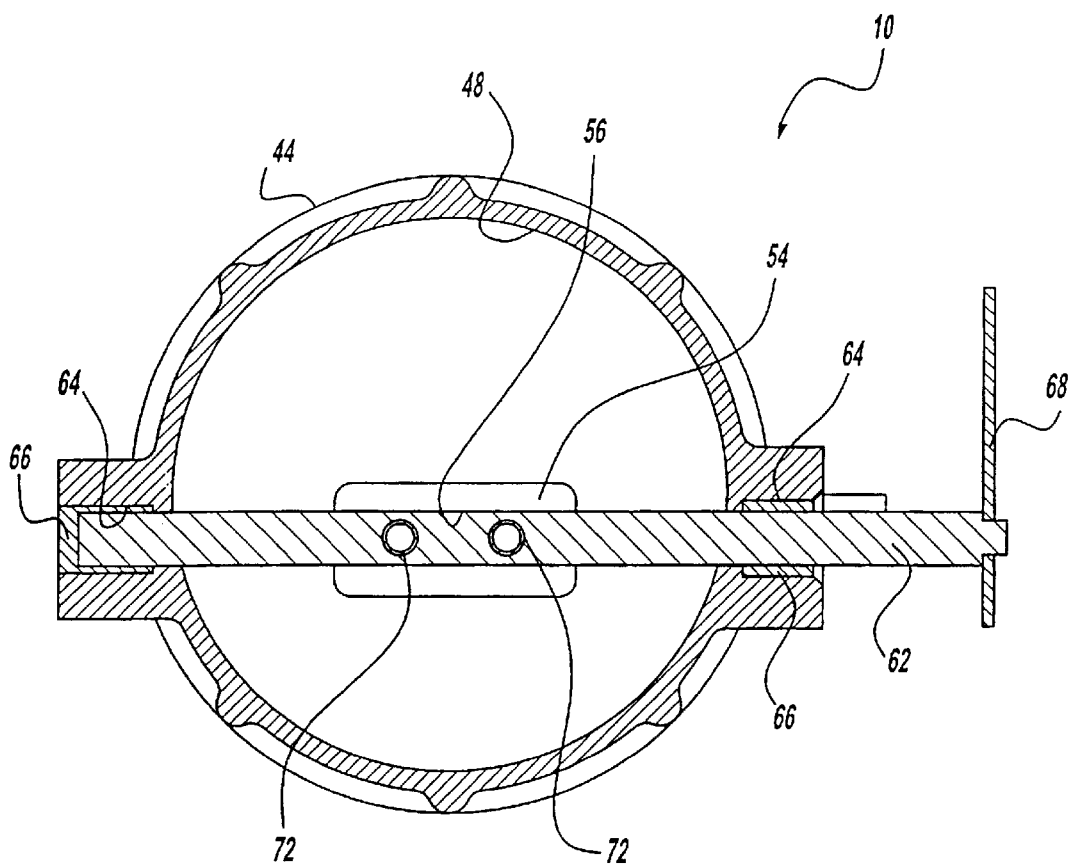
FIG. 6 is a fragmentary end elevational view of the exhaust valve of FIG. 1.

Referring to FIGS. 4 through 6, the exhaust valve 10 includes a housing or shell. 44 extending axially for engaging the exhaust pipe 28. The housing 44 is generally cylindrical in shape and has a passageway 46 extending axially therethrough. The passageway 46 has a generally circular cross-sectional shape. The housing 44 has a reduced diameter portion 48 disposed between the ends of the passageway 46 for a function to be described. The housing 44 is made of a metal material such as steel and formed as a casting.

The exhaust valve 10 includes a butterfly plate 50 disposed in the reduced diameter portion 48 of the housing 44. The butterfly plate 50 includes a plate portion 51. The plate portion 51 is generally planer and circular in shape. The butterfly plate 50 has an annular groove 52 extending radially inwardly from a periphery of the plate portion 51. The butterfly plate 50 includes a shaft portion 54 extending outwardly from a low-pressure side of the plate portion 51. The shaft portion 54 is semi-circular in shape and extends axially. The shaft portion 54 has an aperture 56 extending axially therethrough. The aperture 56 has an axis 58 that is laterally offset from a longitudinal axis of the housing 44 by a predetermined amount such as six millimeters. The axis 58 of the aperture 56 is also longitudinally offset from a plane extending through the groove 52 by a predetermined amount such as six millimeters. The butterfly plate 50 is made of a metal material such as steel. It should be appreciated that the lateral offset of the axis 58 must be equal to the longitudinal offset in order for the plate/ring diameter to fit in the exhaust valve 10 during the open position and closed position.

The exhaust valve 10 also includes a ring seal 60 disposed in the groove 52 of the plate portion 51 between the butterfly plate 50 and the housing 44 to prevent exhaust gases from leaking between the butterfly plate 50 and the housing 44. The ring seal 60 is generally circular in shape and has a rounded and smooth outer periphery. The ring seal 60 is made of a metal material such as steel. The ring seal 60 extends beyond the periphery of the plate portion 51 and is compressible radially in the groove 52. The groove 52 or the seal ring 60 may include a projection or divot 61 to prevent the ring seal 60 from rotating along the groove 52. It should be appreciated that the ring seal 60 allows for circular expansion and is similar to that on a piston (not shown) of the engine 16. It should also be appreciated that the ring seal 60 seals three hundred sixty degrees relate to the housing 44. It should further be appreciated that the ring seal 60 will help remove diesel particulate matter by scraping the walls of the housing 44 during actuation.

The exhaust valve 10 further includes a rotatable shaft 62 for rotating the butterfly plate 50. The shaft 62 is generally cylindrical in shape and has a generally circular cross-section. The shaft 62 extends through the aperture 56 in the shaft portion 54 and corresponding apertures 64 in the housing 44. The exhaust valve 10 includes a bushing 66 disposed in each of the apertures 64 and about the shaft 62 to allow rotation of the shaft 62 relative to the housing 44. The exhaust valve 10 also includes a lever plate 68 connected to one end of the shaft 62. The exhaust valve 10 includes a control actuator 70 connected to the lever plate 68 to rotate the lever plate 68, shaft 62 and butterfly plate 50 to control the opening and closing of the butterfly plate 50. It should be appreciated that the shaft 62 is connected to the butterfly plate 50 by suitable means such as rivets 72. It should also be appreciated that the bushings 66 are located after the ring seal 60 and subject to only ambient pressure (low-pressure zone), resulting in negligible leakage of exhaust gases.

In operation, exhaust gases from the engine 16 flow through the exhaust manifold 20 and catalytic converter 22 of the exhaust system 18 to the exhaust heat recovery system 12. Upon cold start of the engine 16, the exhaust valve 10 is closed and these hot exhaust gases enter the heat exchanger 34 and flow therethrough to the second end 32 and out to the muffler 24 and tailpipe 26. During this time period, the backpressure valve 38 is open and the exhaust valve 10 is closed. In the closed position, the butterfly plate 50 is perpendicular to the exhaust flow as represented by solid lines in FIG. 5 to create a high pressure zone on one side of the plate portion 51 and a low pressure zone on the other side of the plate portion 51 Coolant entering the inlet 40 of the heat exchanger 34 flows through the heat exchanger 34 and is heated, exiting through the outlet 42 thereof. After the engine 16 has warmed up for a sufficient time period, the actuator 70 is actuated by a controller (not shown) to rotate the butterfly plate 50 of the exhaust valve 10 to an open position as indicated by the phantom lines in FIG. 5. Once the butterfly plate 50 is opened, the exhaust gases flow through the exhaust pipe 28 from the first end 30 through the passageway 46 of the exhaust valve 10 to the second end 32. During this time, the backpressure valve 38 is closed to prevent exhaust gases from entering the heat exchanger 34. It should be appreciated that the exhaust valve 10 is normally in the open position. It should also be appreciated that the exhaust valve 10 may be used for other exhaust related applications such as de-NOx traps, close-coupled catalysts and/or particulate traps. It should further be appreciated that the exhaust valve 10 may be located within any exhaust system before or after any emission control device and may be used to divert exhaust gases through a heat exchanger without the application of backpressure or as it relates to any emission control, exhaust control, NVH, EGR or heat management areas.

Accordingly, the exhaust valve 10 is more practical than conventional face seals and provides adequate sealing against exhaust flow through the exhaust valve 10 and exhaust flow through the bushings 66. The exhaust valve 10 has significantly better leakage performance, is more durable, and is easier to manufacture.

The present invention has been described in an. illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An exhaust valve for an exhaust heat recovery system of a motor vehicle comprising:

a housing for attachment to the exhaust heat recovery system of the motor vehicle and having a passageway extending axially therethrough;

a rotatable butterfly plate disposed in said passageway of said housing and having a plate portion with an annular groove axially within said plate and extending radially inwardly in a periphery thereof, said plate including a shaft portion extending outwardly from one side of said plate portion and having an aperture extending therethrough, a shaft extending through said aperture, said aperture being offset laterally from a longitudinal axis of said housing; and a metal ring seal disposed in said groove and extending radially beyond the periphery of said plate and being radially compressible in said groove and radially expandable for engagement and disengagement with said housing for opening and closing said passageway to allow and prevent exhaust gases flowing therethrough.

2. An exhaust valve as set forth in claim 1 wherein said plate portion is generally planar and circular in shape.

3. An exhaust valve as set forth in claim 1 including means for securing said shaft to said shaft portion.

4. An exhaust valve as set forth in claim 1 wherein said aperture is offset longitudinally from a plane extending through said groove.

5. An exhaust valve as set forth in claim 1 wherein said housing has a pair of opposed apertures extending diametrically therethrough.

6. An exhaust valve as set forth in claim 5 including a bushing disposed in each of said apertures, said shaft extending through said bushing and said apertures.

7. An exhaust valve as set forth in claim 1 including means for preventing said ring seal from rotating along said groove.

8. An exhaust heat recovery system for a motor vehicle comprising:

an exhaust pipe for attachment to an exhaust system of the motor vehicle;

a heat exchanger disposed in parallel to said exhaust pipe and connected thereto;

a backpressure valve disposed between an exist end of said heat exchanger and said exhaust pipe;

an exhaust valve disposed between an entrance end and the exit end of said exhaust pipe; and said exhaust valve comprising a housing for attachment to said exhaust pipe and having a passageway extending axially therethrough, a rotatable butterfly plate disposed in said passageway of said housing and having a plate portion with an annular groove axially within said plate and extending radially inward in a periphery thereof, and a ring seal disposed in said groove and extending radially beyond the periphery of said plate and being radially compressible in said groove and radially expandable for engagement and disengagement with said housing for opening and closing said passageway to allow and prevent exhaust gases flowing therethrough, said butterfly plate including a shaft portion having an aperture extending therethrough, a shaft extending through said aperture and engaging said housing, said aperture and shaft being offset laterally from a longitudinal axis of said housing.

9. The system of claim 8 wherein the aperture and shaft are offset longitudinally from a plane extending through said groove.

* * * * *